United States Patent
Kelch et al.

(10) Patent No.: US 11,511,419 B2
(45) Date of Patent: Nov. 29, 2022

(54) TASK PLANNING FOR MEASUREMENT VARIANCES

(71) Applicant: Intrinsic Innovation LLC, Mountain View, CA (US)

(72) Inventors: Timothy Robert Kelch, San Jose, CA (US); Ryan Butterfoss, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 309 days.

(21) Appl. No.: 16/865,070

(22) Filed: May 1, 2020

(65) Prior Publication Data

US 2021/0339388 A1    Nov. 4, 2021

(51) Int. Cl.
*B25J 9/16* (2006.01)
*B25J 13/08* (2006.01)

(52) U.S. Cl.
CPC ........... *B25J 9/1661* (2013.01); *B25J 9/1692* (2013.01); *B25J 13/089* (2013.01)

(58) Field of Classification Search
CPC ...... B25J 9/1666; B25J 9/1682; B25J 9/1664; B25J 9/1661; B25J 9/1692; B25J 13/089; G05B 2219/40518; G05B 2219/40323
USPC .......... 700/245; 318/568.11, 568.12, 568.23; 706/14, 16, 46
See application file for complete search history.

(56) References Cited

U.S. PATENT DOCUMENTS

| | | | |
|---|---|---|---|
| 7,792,604 B2 | 9/2010 | Hong et al. | |
| 8,634,950 B2 | 1/2014 | Somonetti et al. | |
| 8,892,255 B2* | 11/2014 | Eberst | B25J 9/1671 700/254 |
| 9,630,316 B2 | 4/2017 | Konolige et al. | |
| 11,173,602 B2* | 11/2021 | Odhner | B25J 15/0009 |
| 11,256,240 B2* | 2/2022 | Byrne | G05B 19/41865 |
| 2010/0179690 A1* | 7/2010 | Matthias | B25J 9/1676 700/8 |
| 2015/0273685 A1* | 10/2015 | Linnell | B25J 9/1664 901/41 |

* cited by examiner

*Primary Examiner* — Dalena Tran
(74) *Attorney, Agent, or Firm* — Fish & Richardson P.C.

(57) ABSTRACT

Methods, systems, and apparatus, including computer programs encoded on computer storage media, for modifying a process definition to ensure accuracy, timeliness, or both of workcell measurement. One of the methods includes receiving an initial process definition for a process to be performed by a robot, wherein the process definition defines a sequence of actions to be performed in a workcell, and wherein a first action in the sequence of actions has an associated measurement tolerance; computing a predicted accumulated measurement variance for each of one or more actions that occur before the first action in the sequence; determining that the predicted accumulated measurement variance for the one or more actions that occur before the first action in the sequence exceeds a threshold; and in response, generating a modified process definition that inserts a measurement action at a location in the sequence before the first action.

20 Claims, 4 Drawing Sheets

TASK PLANNING FOR MEASUREMENT VARIANCES

BACKGROUND

This specification relates to robotics, and more particularly to planning robotic movements.

Robotics planning refers to sequencing the physical movements of robots in order to perform tasks. For example, an industrial robot that builds cars can be programmed to first pick up a car part and then weld a car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a plan that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually-programmed plan for one workcell may be incompatible with a workcell having different physical dimensions.

In many industrial robotics applications, a major success or failure criteria for executing a plan is confidence in the measurement of the workcell. Accuracy, timeliness, or both, of the measurement can affect such confidence. For example, at a welding station in a car assembly line, the more confident a robot is about the actual location or shape of a car body, the more precisely the robot can complete the welds on the car body.

SUMMARY

This specification describes how a system can generate a process definition that specifies a sequence of actions to be performed by one or more robots in a workcell. The process definition enables a robotic control system to maintain at least a threshold level of confidence in the measurements that characterize various states of the workcell. The process definition further allows for the robotic control system to issue proper measurement-based commands to precisely control robot movements. The system can generate the process definition from a received initial process definition that was generated offline.

Particular embodiments of the subject matter described in this specification can be implemented so as to realize one or more of the following advantages.

Using techniques described in this specification can dramatically reduce the amount of manual programming required in order to program a robotic control system. The system can automatically generate modified process definitions for the robotic control system to control an arbitrary number of robots and sensors. The robotic control system typically controls robots to execute given tasks based on sending sensor-based commands. However, constant sensor measurement, e.g., position tracking of a target object, is made particularly difficult when robot is moving in and out of the field of view of one or more of the sensors. Additionally, when the target object is a deformable object, ongoing changes to the shape or volume of the target object can take place during robot operation, rendering even very recent sensor measurements obsolete. Such factors result in a decreased overall confidence of the control system in the sensor measurements, which in turn impacts its capability in controlling the robots to effectively perform the given tasks.

Manually generating process definitions to ensure that the sensors can capture accurate and timely measurements throughout task execution, however, is extremely time-consuming and error-prone, e.g., due to the complexity of the task, varying numbers or types of sensors that are involved, or some other external restrictions.

In contrast, certain techniques described in this specification allow the system to automatically generate new process definitions that enable the robotic control system to maintain at least a threshold level of confidence in the measurements throughout the task execution and thereby issue proper sensor-based commands to precisely control robot movements. The system can improve the efficiency in generating such new process definitions by dynamically estimating individual or accumulated measurement variances and interpolating the sequence of actions specified by an initial process definition. The new process definition improves the performance of the robots on the given tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
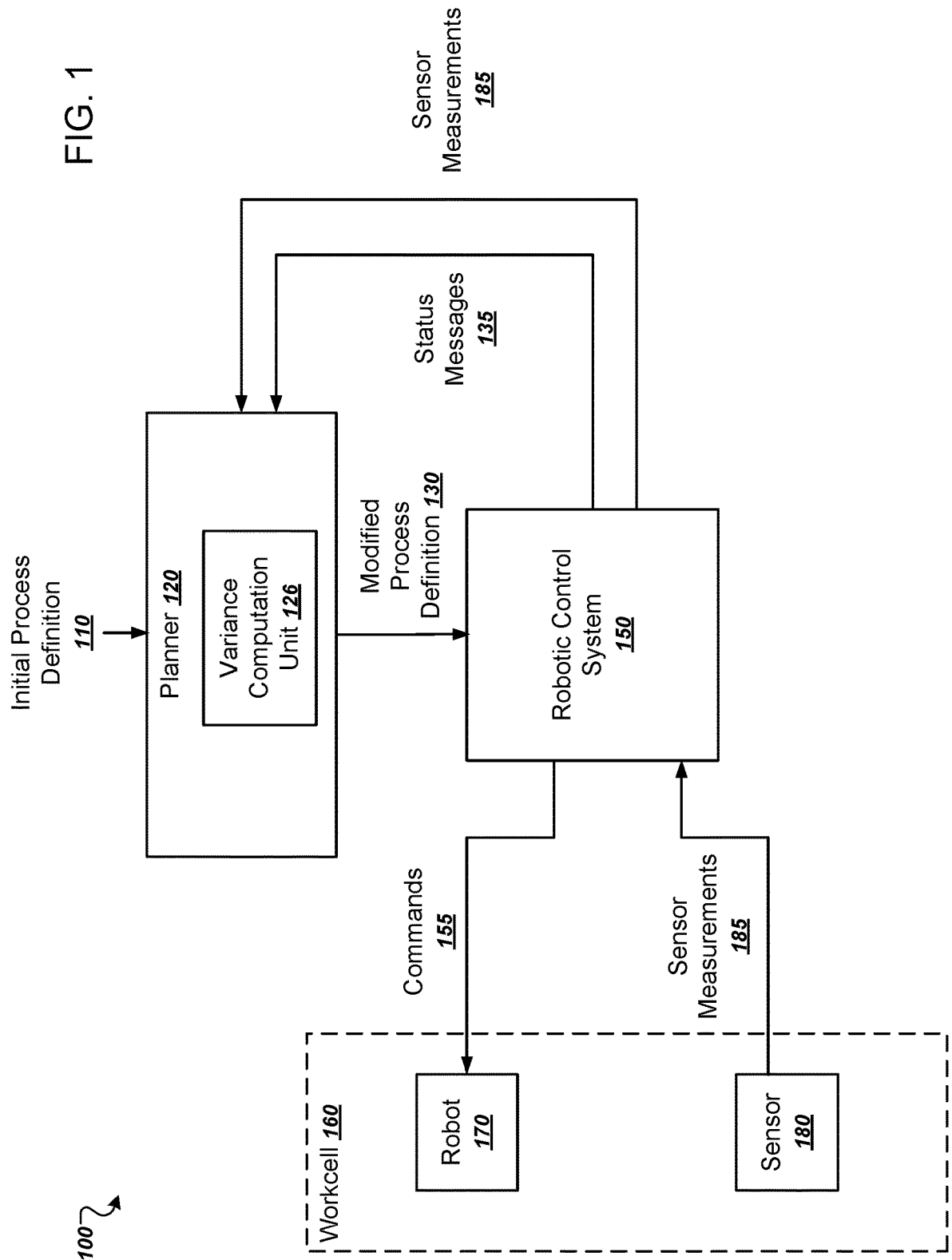
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120 and a robotic control system 150. Each of these components can be implemented as computer programs installed on one or more computers in one or more locations that are coupled to each other through any appropriate communications network, e.g., an intranet or the Internet, or combination of networks. The system 100 also includes a workcell 160 that includes one or more robots, e.g., robot 170, and one or more sensors, e.g., sensor 180.

The robotic control system 150 is configured to control the robots in the workcell 160 by providing commands 155 to be executed by the robots. The sensor 180 is configured to capture measurements of the workcell 160. The sensor 180 can be any device that can take measurements of a current state of the workcell 160, e.g. a camera, a lidar sensor, or an ultrasonic sensor. Depending on various sensor types, the measurements can be object mass, volume, shape, size, position, velocity, or the like. In some implementations, there can be multiple sensors in the workcell 160, where different sensors are of a different type, differently configured than the other sensors in the workcell 160, and/or in a different position in the workcell 160. For example, a sensor can be coupled to a robot, or mounted on stationary or movable surfaces in the workcell 160.

The robotic control system 150 can use the measurement to control the robots to perform given tasks by providing sensor-based commands. For example, the robotic control system 150 can use the sensor measurements 185 to know where each obstacle in the workcell 160 is currently located, and thus send new commands 155 for the robots in the workcell 160 to move without colliding with any obstacle in the workcell 170. As another example, the robot control system 150 can use the sensor measurements 185 to know that an object is not in an expected location and then send new commands 155 for the robots in the workcell 160 to move the object to the expected location.

In various cases, however, obtaining the measurement may be difficult or impractical. For example, an object may be occluded from the sensor while undergoing a specific processing at a closed station, rendering any sensor observation impossible during the processing. As another example, an object may be a deformable object, i.e., an object that is not fully rigid (at least during processing), and thus requires frequent sensor observations in order to determine an up-to-date measurement. Further, the obtained measurements may be inaccurate, for example, due to lack of proper sensor calibration. Either alone or in combination, these example factors result in a decreased level of confidence of the robotic control system 150 in the measurement of the workcell 160, which in turn impacts its capability in controlling the robots to effectively perform the given tasks.

The overall goal of the planner 120 is to generate a process definition that allows the robotic control system 150 to effectively execute a task which in turn includes a sequence of actions by ensuring accurate and/or timely measurement of the workcell 160.

The planner 120 receives an initial process definition 110. The initial process definition 110 can be generated by a user or another planner. The initial process definition 110 can specify a sequence of actions to be performed by the robots in the workcell 160. The initial process definition 110 can also specify desired confidence level in the measurement of the workcell 160 while the robots are performing the sequence of actions.

For example, the initial process definition 110 can specify a manufacturing process, where the robot moves an object among different stations to apply different types of processing on the object. For example, the processing can be an assembly, packing, welding, or gluing processing. And the initial process definition 110 further specifies that, before a specific processing takes place, a measured position of the object must be within 1 mm of its actual position in the workcell 160, e.g., with reference to the robot 170.

As another example, the initial process definition 110 can specify that the object must be observable by the sensor 180 at least once during a specific processing. That is, the object must not be occluded from the sensor 180 throughout the specific processing in order for the robotic control system 150 to track the shape or position of the object while being processed.

The planner 120 uses the initial process definition 110 to generate a modified process definition 130 for the robotic control system 150 that, when executed by the robots in the workcell 170, executes the sequence of actions specified in the initial process definition 110 while satisfying the measurement requirements specified in the initial process definition 110. To generate the modified process definition 130, the planner 120 typically inserts one or more additional measurement actions to the sequence of actions specified by the initial process definition 110.

In some implementations, the planner 120 consumes sensor measurements 185 made by the sensors making observations within the workcell 160. For example, the planner 120 can receive the sensor measurements 185 directly from the sensors or through the robotic control system 150, e.g., by a wired or wireless connection. The planner 120 then uses the sensor measurements 185 to determine how to adjust the initial process definition 110 to generate the modified process definition 130.

In some implementations, the planner 120 consumes status messages 135 generated by the robotic control system 150. For example, the status messages 135 can specify sensor make/model/configuration/known variances, and the like for the actual sensors that are used in the workcell. As another example, the status messages 135 can include robot statistics or feedbacks at runtime. As such, the status messages 135 provide additional information that might be critical for determining the measurement variances. The status messages 135 further allows for the planner 120 to generate workcell-specific process definitions, i.e., process definitions that are highly tailored for individual workcells. In other words, the planner 120 can generate different modified process definitions for different workcells, even when starting with a same initial process definition. In this way, for example, one workcell at a first site having very new cameras might end up performing the measurement action later in the process than the robots in another workcell at a second site having older cameras.

In some implementations, the planner 120 generates the modified process definition 130 based on using a variance computation unit 126. The variance computation unit 126 implements software that is configured to compute predicted measurement variances of one or more actions in the sequence of actions. This process is described in more detail below in reference to FIGS. 2-3.

The modified process definition 130, which, for brevity may also be referred to as a final plan, contains enough information to drive the robots to complete the given task in a high quality manner. In particular, during execution of the modified process definition 130, the robotic control system 150 is able to maintain the confidence level in workcell measurement that is required in the initial process definition 110.

The planner 120 gives the modified process definition 130 to the robotic control system 150. In some implementations, the planner 120 is an offline planner. That is, the planner 120 can provide the modified process definition 130 to the robotic control system 150 before the robotic control system 150 executes any operations, and the planner 120 does not receive any direct feedback from the robotic control system 150. In some such implementations, the planner 120 can be hosted offsite at a data center separate from the robotic control system 150.

In some other implementations, the planner 120 can be an online planner. That is, the robotic control system 150 can receive the modified process definition 130 and begin execution, and provide feedback on the execution to the planner 120. The planner 120 can respond to feedback from the robotic control system 150, and generate a new modified process definition in response to the feedback.

The robotic control system 150 executes the modified process definition 130 by issuing commands 155 to the workcell 160 in order to drive the movements of the robot.

The robotic control system 150 can also issue commands 155 to the sensor 180. For example, the commands 155 can identify particular times at which the sensor 180 should capture certain desired observations of the workcell 160. In some implementations, the sensor 180 can also be moved within the workcell 160. For example, the sensor 180 can be attached to a robotic arm that can move the sensor to different positions throughout the workcell 180 in order to capture certain desired observations. In these implementations, the robotic control system 150 can issue commands 155 that specify an orientation and/or position of the sensor 180 for each desired observation.

While the robots in the workcell 160 are executing the commands 155, the sensor 180 can capture sensor measurements 185 identified in the commands 155 and send the sensor measurements 185 to the robotic control system 150 or other components of the system 100.

Figure 2:
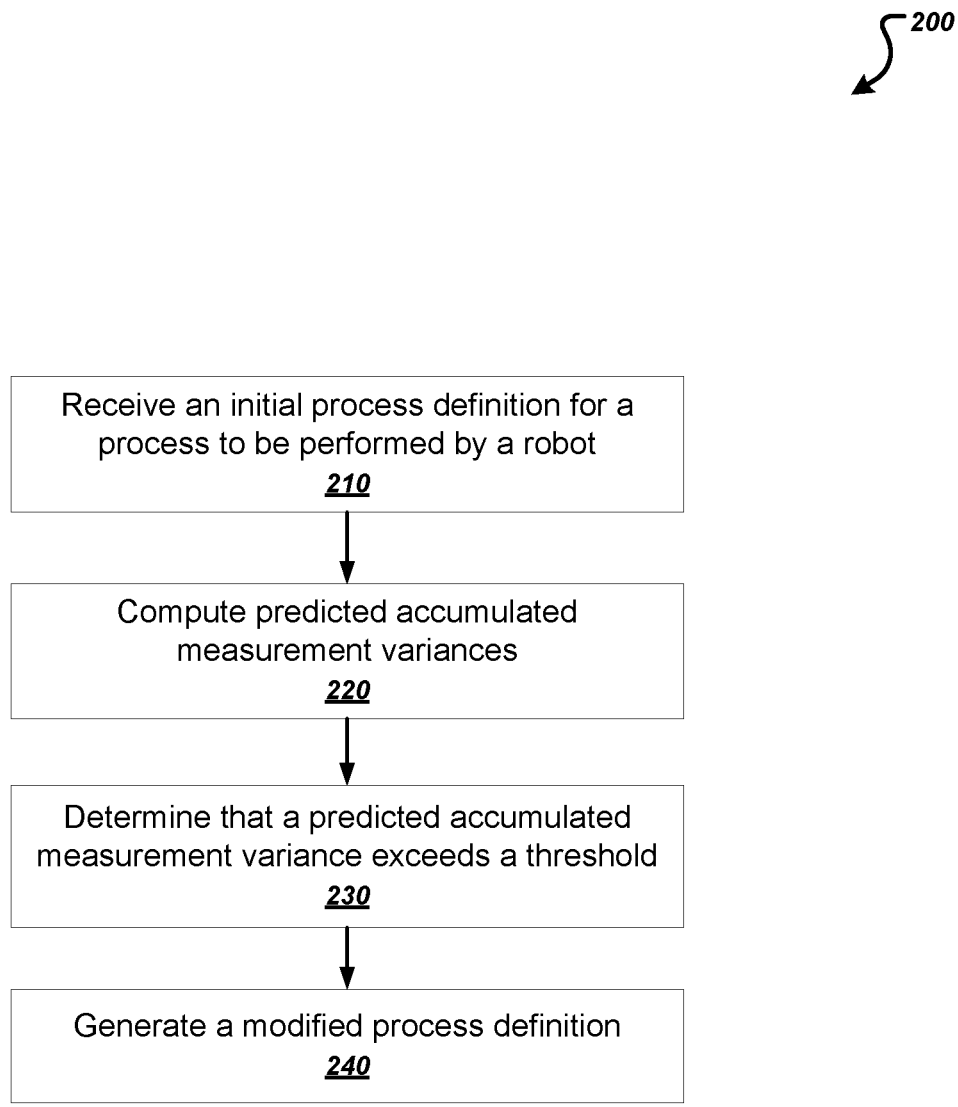
FIG. 2 is a flowchart of an example process for modifying a process definition for a process to be performed by a robot.

FIG. 2 a flowchart of an example process for modifying a process definition for a process to be performed by a robot. The example process can be performed by a system of one or more computers programmed in accordance with this specification, e.g., a system including the planner 120 of FIG. 1. The example process will be described as being performed by a system of one or more computers.

The system receives an initial process definition for a process to be performed by one or more robots (210). In some implementations, the initial process definition is computed offline. For example, the initial process definition can be computed by the planner 120 from FIG. 1. The initial process definition is a process definition for performing a particular task using one or more robots and one or more sensors in a workcell. The particular task typically involves a sequence of actions to be performed in a workcell. For example, an action can be moving the robot to an objective location where the robot is expected to perform the task. As another example, an action can be capturing an observation of the workcell using the sensors to obtain a measurement of the workcell, e.g., a position of a target object in the workcell.

The initial process definition can also specify a desired level of confidence in respective measurements captured by the sensors while performing the particular task, e.g., at a particular action among the sequence of actions. The confidence can be defined, for example, with respect to an estimated quality, e.g., accuracy, tolerance, or coverage, of the current measurement, a length of time that has elapsed since the last measurement, or both. For example, the initial process definition specifies that a deformable object gluing action has an associated shape measurement tolerance, i.e., an allowable amount by which the measured shape may vary from the actual shape of an object. As another example, the initial process definition can specify that an object handling action has an associated positional measurement tolerance, i.e., an allowable amount by which the measured position may vary from the actual position of an object.

Figure 3A:
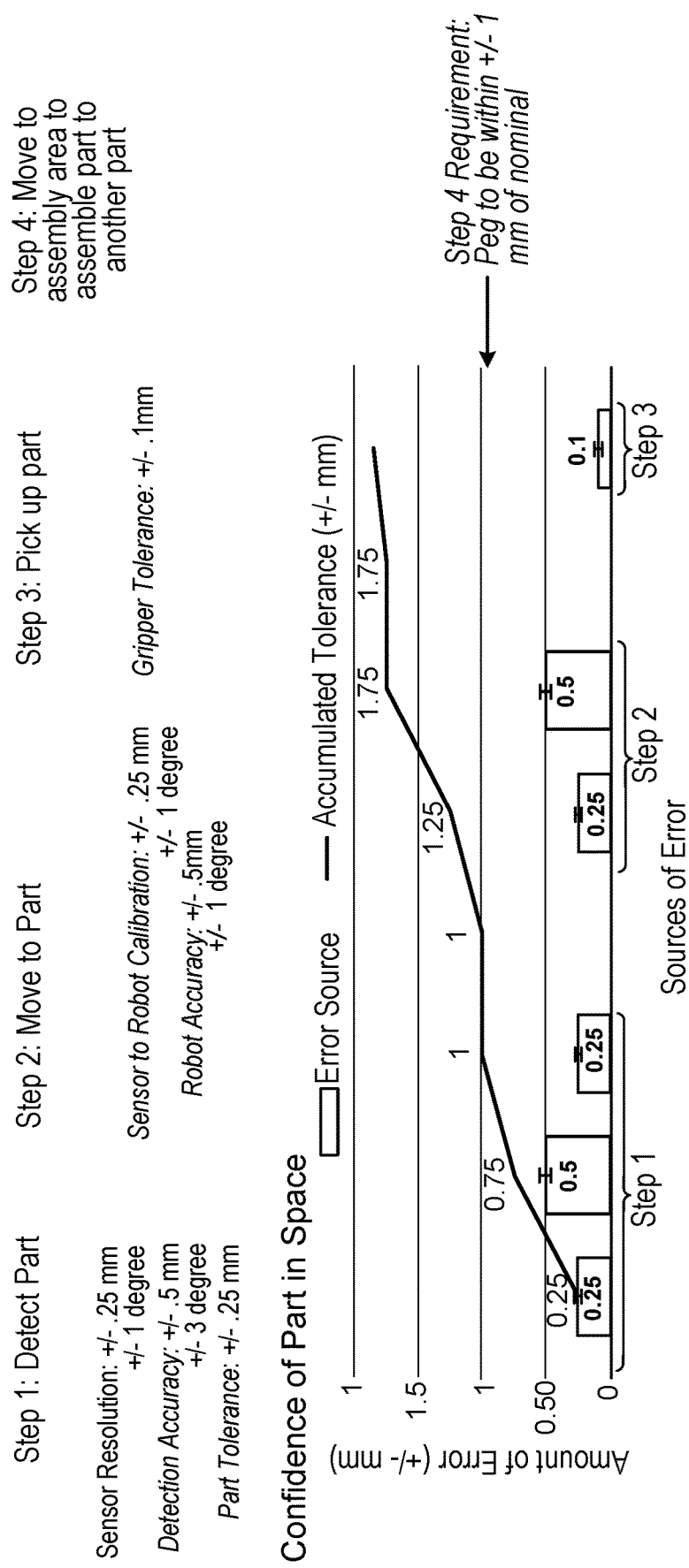
FIG. 3A illustrates an example initial process definition for a process to be performed by a robot.

FIG. 3A illustrates an example initial process definition for a process to be performed by a robot. As depicted, the initial process definition includes four actions: (1) detect part, (2) move to part, (3) pick up part, and (4) move to assembly area to assemble part to another part. The initial process definition also specifies obtaining measurements at the first and second actions.

The system computes a predicted accumulated measurement variance for each of one or more actions that occur before the particular action in the sequence of actions (220).

In general, the system can perform the computation based on properties of resources being used for each of the actions in the sequence of actions. Example resources include the sensors capturing the observations, the fixtures or tools installed at the processing stations, the object that is being operated on by the robot, and the robot itself, including any end effectors attached to the robot. As such, the computation of the predicted measurement variance at each action can be based on one or more of sensor resolution, sensor detection accuracy, object tolerance, sensor to robot calibration, robot accuracy, or end effector tolerance.

In the example of FIG. 3A, for the first action, the system can determine that sensor resolution (+/−0.25 mm), sensor detection accuracy (+/−0.5 mm), and object tolerance (+/−0.25 mm) may collectively contribute to variances in the positional measurements of the object that is being operated on by the robot. The system can then compute a sum of these numeric values, thereby generating a predicted measurement variance for the first action to be +/−1.0 mm. For the second action, the system combines sensor to robot calibration (+/−0.25 mm) and robot accuracy (+/−0.5 mm) to compute a predicted measurement variance of +/−0.75 mm. The system also computes a predicted accumulated measurement variance for the second step, +/−1.75 mm, by combining the respective predicted measurement variances at the preceding actions, i.e., the first and second actions. In a similar way, for the third action, the system computes a predicted measurement variance of +/−0.1 mm, and an accumulated predicted measurement variance of +/−1.85 mm.

The system determines that the predicted accumulated measurement variance for the one or more actions that occur before the particular action in the sequence exceeds a threshold (230). The system can determine the threshold based on the associated measurement tolerance of the particular action, as specified by the initial process definition. The threshold is usually equal to associated measurement tolerance, or, in some cases, tighter than the associated measurement tolerance to provision a buffer to accommodate any unexpected measurement variances.

In the example of FIG. 3A, the initial process definition specifies that the positional measurement tolerance associated with the fourth action is required to be within +/−1.0 mm of the actual position of the object in the workcell. Accordingly, the system determines that the predicted accumulated measurement variance at the third action, which was computed to be +1-1.85 mm, exceeds the +/−1.0 mm threshold.

The system generates, in response to a positive determination, a modified process definition that inserts one or more measurement actions at one or more locations in the sequence before the particular action (240). Generally, such location can be any location preceding the particular action in the sequence. The measurement action defines an action of capturing an observation of the workcell, or more precisely, an observation of a particular region or object within the workcell using one or more sensors. For example, the measurement action involves causing the robot to move a target object within a field of view of a sensor such that the sensor can capture an observation of the target object. As another example, the measurement action involves moving a portable sensor towards a target region to capture the observation of the target region.

In some implementations, the system can insert a measurement action immediately preceding the particular action in the sequence. In some other implementations, the system can compute the location in the sequence such that recomputed accumulated measurement variances for one or more actions between the location and the particular action having the associated measurement tolerance do not exceed the threshold.

In some cases, adding additional measurement actions may require additional workcell resources. Thus, the system can also generate information representing what additional resources might be needed in the workcell in order to achieve the measurement requirements of the initial process definition. For example, the system can determine that the measurement requirements cannot be achieved without an additional sensor. Then, depending on the actual process and workcell layout, the system can generate information indicating that an additional sensor should be attached to an arm of the robot or that it should be mounted on stationary or movable surface in the workcell. As another example, the system can generate information indicating that the workcell or a processing station should be reconfigured such that the additional sensor can capture certain desired observations of the workcell. Such information can include, for example, a new design of workcell layout or documentation of a different processing station. As yet another example, the system can generate information indicating that alternative end effectors are required to secure an additional sensor to the arm of the robot.

Figure 3B:
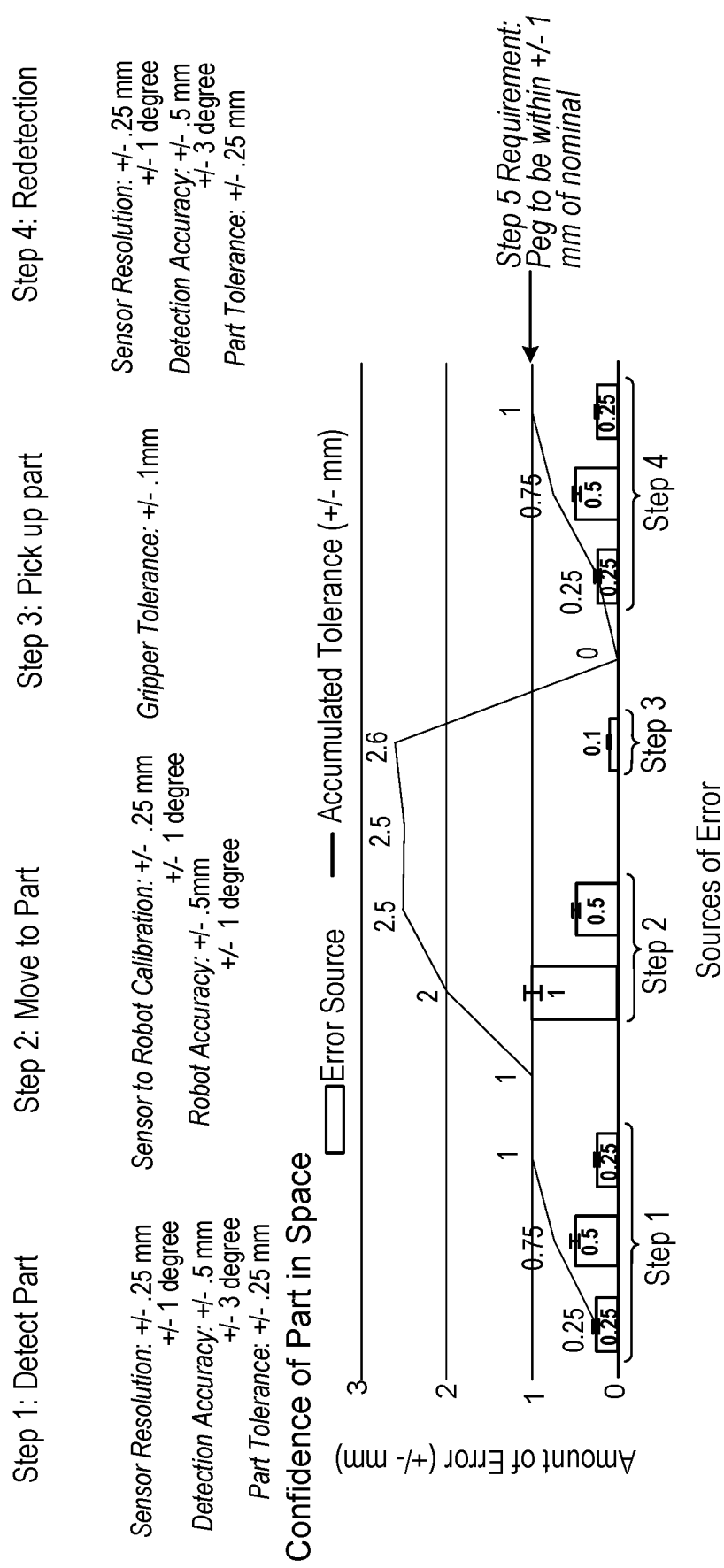
FIG. 3B illustrates an example modified process definition for a process to be performed by a robot.

FIG. 3B illustrates an example modified process definition for a process to be performed by a robot. In this example, the system generates the modified process definition by inserting a measurement action immediately preceding the fourth action previously specified in the initial process definition that is illustrated in FIG. 3A. The measurement action specifies capturing a positional measurement of the object that is being operated on by the robot using the sensor that was previously used at the first action from the initial process definition.

As depicted, the modified process definition includes five actions: (1) detect part, (2) move to part, (3) pick up part, (4) measurement ("redetection"), and (5) move to assembly area to assemble part to another part. Correspondingly, at the fourth step, the system resets the accumulated predicted measurement variance that was previously computed for the third step and instead recomputes the accumulated predicted measurement to be +/−1.0 mm, i.e., by combining sensor resolution (+/−0.25 mm), sensor detection accuracy (+/−0.5 mm), and object tolerance (+/−0.25 mm). In this way, the recomputed accumulated predicted measurement at the fourth action (or equivalently, the third action from the initial process definition) no longer exceeds the threshold of +/−1.0 mm, thereby meeting the requirement from the initial process definition.

After the process 200 has been performed for one or more times, the system can proceed to execute the modified process definition. For example, the system can use a control system, e.g. the robotic control system 150 depicted in FIG. 1, to send commands to a robot in the robotic operating environment, where the commands are issued according to the modified process definition.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving an initial process definition for a process to be performed by a robot, wherein the process definition defines a sequence of actions to be performed in a workcell, and wherein a first action in the sequence of actions has an associated measurement tolerance;

computing a predicted accumulated measurement variance for each of one or more actions that occur before the first action in the sequence;

determining that the predicted accumulated measurement variance for the one or more actions that occur before the first action in the sequence exceeds a threshold; and in response, generating a modified process definition that inserts a measurement action at a location in the sequence before the first action.

Embodiment 2 is the method of embodiment 1, wherein computing the predicted accumulated measurement variance is based on properties of resources being used for each of the actions in the sequence of actions.

Embodiment 3 is the method of embodiment 2, wherein the properties of the resources comprises one or more of sensor resolution, detection accuracy, part tolerance, sensor to robot calibration, robot accuracy, gripper tolerance, or object tolerance.

Embodiment 4 is the method of any one of embodiments 1-3, further comprising: computing, from the initial process definition graph, a second modified process definition for a different workcell having different resource properties than the first workcell, wherein the second modified process definition includes the measurement action at a different location in the sequence.

Embodiment 5 is the method of any one of embodiments 1-4, wherein the modified process definition adds an additional resource in the workcell for the process.

Embodiment 6 is the method of embodiment 5, wherein the additional resource is an additional sensor.

Embodiment 7 is the method of embodiment 6, wherein the sensor is attached to an arm of the robot.

Embodiment 8 is the method of any one of embodiments 1-7, further comprising: computing the location in the sequence such that second accumulated measurement variances for one or more actions between the location and the first action having the associated measurement tolerance do not exceed the threshold.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving an initial process definition for a process to be performed by a robot, wherein the initial process definition defines a sequence of actions to be performed in a workcell, and wherein a first action in the sequence of actions has an associated measurement tolerance;
   computing a predicted accumulated measurement variance for each of one or more actions that occur before the first action in the sequence;
   determining that the predicted accumulated measurement variance for the one or more actions that occur before the first action in the sequence exceeds a threshold; and
   in response, generating, before the robot executes any operations of the initial process definition, a modified process definition that inserts a measurement action at a location in the sequence before the first action.

2. The method of claim 1, wherein computing the predicted accumulated measurement variance is based on properties of resources being used for each of the actions in the sequence of actions.

3. The method of claim 2, wherein the properties of the resources comprises one or more of sensor resolution, detection accuracy, object tolerance, sensor to robot calibration, robot accuracy, or end effector tolerance.

4. The method of claim 3, further comprising:
   computing, from the initial process definition graph a second modified process definition for a different workcell having different resource properties than the first workcell, wherein the second modified process definition includes the measurement action at a different location in the sequence.

5. The method of claim 1, wherein the modified process definition adds an additional resource in the workcell for the process.

6. The method of claim 5, wherein the additional resource is an additional sensor.

7. The method of claim 6, wherein the sensor is attached to an arm of the robot.

8. The method of claim 1, further comprising:
   computing the location in the sequence such that second accumulated measurement variances for one or more actions between the location and the first action having the associated measurement tolerance do not exceed the threshold.

9. A system comprising one or more computers and one or more storage devices storing instructions that are operable, when executed by the one or more computers, to cause the one or more computers to perform operations comprising:
   receiving an initial process definition for a process to be performed by a robot, wherein the initial process definition defines a sequence of actions to be performed in a workcell, and wherein a first action in the sequence of actions has an associated measurement tolerance;

computing a predicted accumulated measurement variance for each of one or more actions that occur before the first action in the sequence;

determining that the predicted accumulated measurement variance for the one or more actions that occur before the first action in the sequence exceeds a threshold; and in response, generating, before the robot executes any operations of the initial process definition, a modified process definition that inserts a measurement action at a location in the sequence before the first action.

10. The system of claim 9, wherein computing the predicted accumulated measurement variance is based on properties of resources being used for each of the actions in the sequence of actions.

11. The system of claim 10, wherein the properties of the resources comprises one or more of sensor resolution, detection accuracy, part tolerance, sensor to robot calibration, robot accuracy, gripper tolerance, or object tolerance.

12. The system of claim 11, wherein the operations further comprise:

computing, from the initial process definition a second modified process definition for a different workcell having different resource properties than the first workcell, wherein the second modified process definition includes the measurement action at a different location in the sequence.

13. The system of claim 9, wherein the modified process definition adds an additional resource in the workcell for the process.

14. The system of claim 13, wherein the additional resource is an additional sensor.

15. The system of claim 14, wherein the sensor is attached to an arm of the robot.

16. The system of claim 9, wherein the operations further comprise:

computing the location in the sequence such that second accumulated measurement variances for one or more actions between the location and the first action having the associated measurement tolerance do not exceed the threshold.

17. One or more non-transitory computer storage media encoded with computer program instructions that when executed by a plurality of computers cause the plurality of computers to perform operations comprising:

receiving an initial process definition for a process to be performed by a robot, wherein the initial process definition defines a sequence of actions to be performed in a workcell, and wherein a first action in the sequence of actions has an associated measurement tolerance;

computing a predicted accumulated measurement variance for each of one or more actions that occur before the first action in the sequence;

determining that the predicted accumulated measurement variance for the one or more actions that occur before the first action in the sequence exceeds a threshold; and in response, generating, before the robot executes any operations of the initial process definition, a modified process definition that inserts a measurement action at a location in the sequence before the first action.

18. The non-transitory computer storage media of claim 17, wherein computing the predicted accumulated measurement variance is based on properties of resources being used for each of the actions in the sequence of actions.

19. The non-transitory computer storage media of claim 18, wherein the properties of the resources comprises one or more of sensor resolution, detection accuracy, part tolerance, sensor to robot calibration, robot accuracy, gripper tolerance, or object tolerance.

20. The non-transitory computer storage media of claim 17, wherein the operations further comprise:

computing the location in the sequence such that second accumulated measurement variances for one or more actions between the location and the first action having the associated measurement tolerance do not exceed the threshold.

\* \* \* \* \*